United States Patent [19]

Aoki et al.

[11] Patent Number: 4,999,708
[45] Date of Patent: Mar. 12, 1991

[54] SYNCHRONOUS SEPARATION CIRCUIT

[75] Inventors: Tetsuo Aoki, Kawasaki; Fumitaka Asami, Kunitachi, both of Japan

[73] Assignee: Fujitsu Limited, Kawasaki, Japan

[21] Appl. No.: 299,534

[22] Filed: Jan. 23, 1989

[30] Foreign Application Priority Data

Jan. 22, 1988 [JP] Japan ................................. 63-013116

[51] Int. Cl.$^5$ .......................... H04N 5/08; H04N 5/10
[52] U.S. Cl. ....................................... 358/153; 358/154
[58] Field of Search ........................ 358/148, 153, 154

[56] References Cited

U.S. PATENT DOCUMENTS

| 4,491,870 | 1/1985 | Aschwanden | 358/153 |
|---|---|---|---|
| 4,675,734 | 6/1987 | Widom | 358/153 |
| 4,701,796 | 10/1987 | Kamiya | 358/153 |
| 4,769,704 | 9/1988 | Hirai et al. | 358/153 |
| 4,792,852 | 12/1988 | Narusawa | 358/153 |

Primary Examiner—John W. Shepperd
Assistant Examiner—Michael D. Parker
Attorney, Agent, or Firm—Staas & Halsey

[57] ABSTRACT

A synchronous separation circuit used in a television video circuit for generating a horizontal synchronizing signal and a vertical synchronizing signal from a composite synchronizing signal has: a unit for generating a clock signal used as a reference signal and having a frequency higher than the frequency of the horizontal synchronizing signal; a unit for counting the clock signal from a front edge of a pulse contained in the composite synchronizing signal; a unit for obtaining a horizontal synchronous separation and for determining a counting term and outputting the horizontal synchronizing signal after the counting unit counts from the front edge of the horizontal synchronizing signal to a predetermined number; and a unit for obtaining a vertical synchronous separation and for latching the composite synchronizing signal based on an output of the counting unit, separate the vertical synchronizing signal from the composite synchronizing signal.

3 Claims, 5 Drawing Sheets

INPUT WAVEFORM

OUTPUT WAVEFORM

SYNCHRONOUS SEPARATION CIRCUIT

BACKGROUND OF THE INVENTION

1. Field of the Invention

The present invention relates to an improvement of a synchronous separation circuit used in a television video circuit, more particularly, it relates to a synchronous separation circuit enabling the separation of a horizontal synchronizing signal and a vertical synchronizing signal from a composite synchronizing signal, based on a digital signal processing technique.

2. Description of the Related Art

In general, a raster scanning method is widely employed in the television video circuit, and in this method, an image is separated by a plurality of scanning lines and each of the scanning lines is processed in a time-series. As is well known, there are two types of raster scanning methods; a non-interlace scanning type and an interlace scanning type, and in both types, the synchronizing signal must be used for scanning the image as a reference signal. Note, a horizontal synchronizing signal is used as the scanning reference signal for the horizontal direction and a vertical synchronizing signal is used as the scanning reference signal for the vertical direction.

The synchronous separation circuit is usually located after a video amplification stage in the television video circuit, and is used for separating the composite synchronizing signal from a composite video signal, and for further separating the horizontal synchronizing signal and the vertical synchronizing signal from the composite synchronizing signal.

The horizontal synchronizing signal and the vertical synchronizing signal are input to a deflection circuit having horizontal deflection and vertical deflection circuits, and the output of the deflection circuit is sent to horizontal and vertical deflection coils.

Conventionally, a differentiating circuit is provided for obtaining the horizontal synchronizing signal and an integrating circuit is provided for obtaining the vertical synchronizing signal from the composite synchronizing signal. These differentiating and integrating circuits are usually constituted by resistors and capacitors, and the horizontal and vertical synchronizing signals are obtained from the composite synchronizing signal through the resistors and capacitors based on an analogue signal processing technique. Namely, the differentiating circuit is a high-pass filter and the integrating circuit is a low-pass filter.

Problems occur, however, in the analogue signal processing techniques used in these circuits, as explained in detail hereinafter.

SUMMARY OF THE INVENTION

The object of the present invention is to provide a synchronous separation circuit enabling the separation of horizontal and vertical synchronizing signals from a composite synchronizing signal, based on a digital signal processing technique.

In accordance with the present invention, there is provided a synchronous separation circuit used in a television video circuit for generating a horizontal synchronizing signal and a vertical synchronizing signal from a composite synchronizing signal. It comprises a clock signal generating circuit for generating a clock signal having a frequency higher than the frequency of the horizontal synchronizing signal; a first frequency dividing circuit for receiving the clock signal and generating a first signal($S_{11}$) by starting to count a pulse from a leading edge of the composite synchronizing signal and by counting a first predetermined count number; a second frequency dividing circuit for receiving the clock signal and generating a second signal ($S_{21}$) by starting to count from a leading edge of the first signal and by counting a second predetermined count number larger than the first predetermined count number; a first reset circuit for resetting the first frequency dividing circuit at every first predetermined count number; and a second reset circuit for resetting the second frequency dividing circuit for outputting the horizontal synchronizing signal from the first and second signals and outputting the vertical synchronizing signal from the clock signal and an output ($S_{41}$) of the first frequency dividing circuit.

The first frequency dividing circuit comprises a plurality of D-type flip-flop circuits connected in series to form T-type flip-flop circuits. The second frequency dividing circuit comprises a number of D-type flip-flop circuits greater than that of the first frequency dividing circuit, and each of the D-type flip-flop circuits is connected in series to form T-type flip-flop circuits.

DESCRIPTION OF THE PREFERRED EMBODIMENTS

Before describing the preferred embodiments, an explanation will be given of conventional horizontal and vertical synchronous separation circuits.

Figure 1:
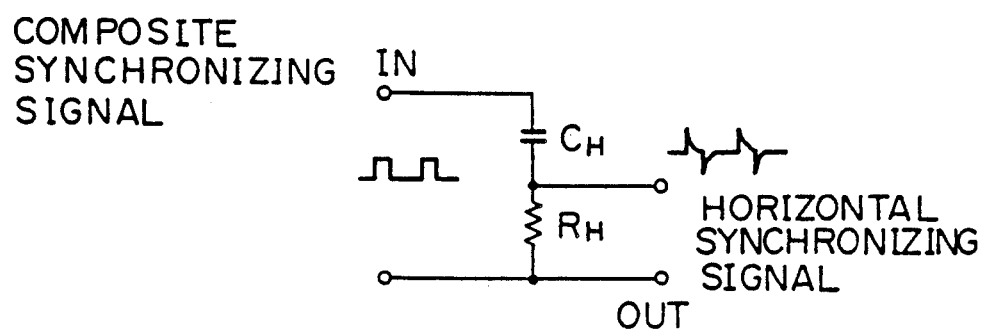
FIG. 1 shows an essential part of a conventional horizontal synchronous separation circuit.
Figure 2:
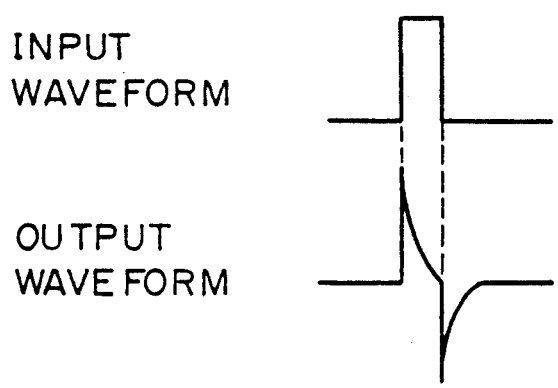
FIG. 2 shows input and output waveforms of the circuit shown in FIG. 1.

FIG. 1 shows an essential part of a conventional horizontal synchronous separation circuit, and FIG. 2 shows input and output waveforms of the circuit shown in FIG. 1. In FIG. 1, the horizontal synchronous separation circuit comprises a differential circuit having a capacitor Ch and resistor Rh, and the differential time constant of this circuit is set to pass only the horizontal synchronizing signal. For example, in the NTSC method, the horizontal synchronizing signal is 15.75 KHz. In FIG. 2, when a signal having a rectangular waveform is input to the terminal IN, a signal having a differential waveform can be obtained from the terminal OUT as the horizontal synchronizing signal. The vertical synchronizing signal is completely cut off in this circuit.

Figure 3:
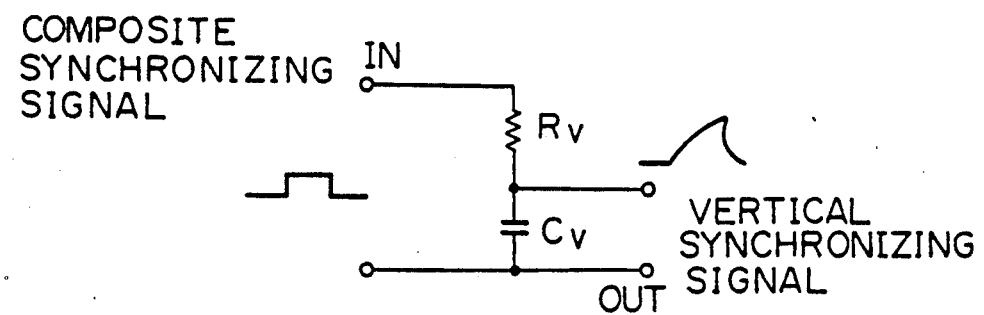
FIG. 3 shows an essential part of a conventional vertical synchronous separation circuit.
Figure 4:
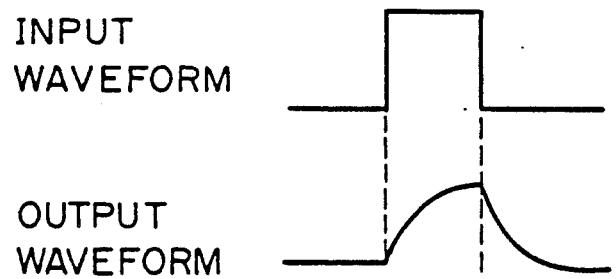
FIG. 4 shows input and output waveforms of the circuit shown in FIG. 3.

FIG. 3 shows an essential part of a conventional vertical synchronous separation circuit, and FIG. 4 shows input and output waveforms of the circuit shown in FIG. 3. In FIG. 3, the vertical synchronous separation circuit comprises an integrating circuit having a resistor Rv and capacitor. Cv, and an integrating time constant of this circuit is set to a value such that the horizontal synchronizing signal can be suppressed and cut off. Further, the integrating time constant is set to a value such that attenuation of the vertical synchronizing signal having a predetermined frequency (60 Hz in the NTSC method) does not occur. In FIG. 4, when a signal having a rectangular waveform is input to the terminal IN, on output signal having an intergrated waveform can be obtained from the terminal OUT. The waveforms of the horizontal and vertical synchronizing signals are shaped by a comparator (not shown) and used as triggers signals for horizontal and vertical deflection circuits.

As explained above, the horizontal synchronous separation circuit is basically constituted by the differential circuit and the vertical synchronous separation circuit is constituted by the integrating circuit, both processing the analogue signal. Nevertheless, problems occur as explained hereinafter.

Namely, the resistors Rh, Rv and the capacitors Ch, Cv used in these circuit are passive electric parts, and accordingly, an electric characteristic of the synchronous separation is greatly affected by the characteristic dispersions of the electric passive parts and a change thereof with the passage of time. For example, when the resistance value of the resistor Rh is slightly increased, the voltage level of the differentiated horizontal synchronizing signal is lowered so that a precise horizontal synchronization can not be obtained. Further, when the capacitance value Cv is slightly decreased, the vertical synchronization becomes unstable and it is difficult to suppress the horizontal synchronizing signal and large pulsative noise.

Further, these circuits preferably should be formed as integrated circuits(IC), thereby to reduce costs, improve reliability, miniaturize the circuit, and simplify maintenance, but it is difficult to achieve the above objects while performing analogue processing technique. Particularly, in the vertical synchronous separation circuit, since the vertical synchronous frequency is very low, as explained above (60 Hz in the NTSC method), a relatively large integration time constant must be used, and this large integration time constant is difficult to achieve in an integrated circuit.

Accordingly, based on the above, the object of the present invention is to provide a synchronous separation circuit enabling the separation of the horizontal and the vertical synchronizing signals from the composite synchronizing signal, based on a digital signal processing technique.

A synchronous separation circuit according to the present invention is explained in detail hereinafter.

Figure 5:
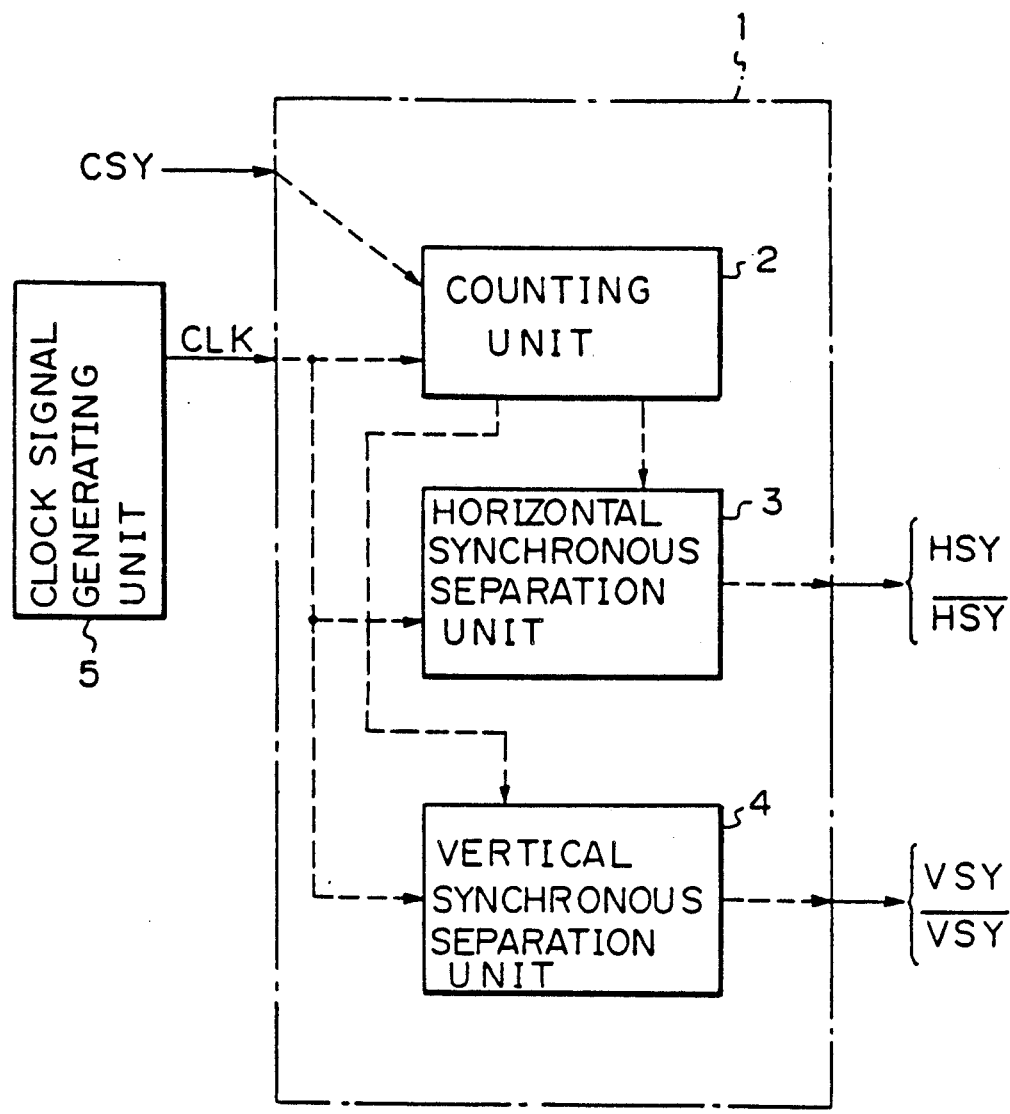
FIG. 5 is a basic block diagram of a synchronous separation circuit according to the present invention.

FIG. 5 is a basic block diagram of a synchronous separation circuit according to the present invention. In FIG. 5, CSY is the composite synchronizing signal, CLK is the clock signal, HSY is the horizontal synchronizing signal, and VSY is the vertical synchronizing signal. Further, reference number 1 represents a synchronous separating circuit, 2 a counting unit, 3 a horizontal synchronous separation unit, 4 a vertical synchronous separation unit, and 5 a clock signal generating unit.

In the present invention, the above three main units 2, 3, and 4 are provided for obtaining the horizontal and vertical synchronizing signals based on the digital signal processing technique. Namely, the synchronous separation circuit is basically constituted by the first means for generating the pulse width of the horizontal synchronizing signal, the second means for cutting off the equalizing pulse from the composite synchronizing signal, and the third means for generating the vertical synchronizing signal from the vertical synchronizing pulse of the composite synchronizing signal.

In more detail, the synchronous separation circuit 1 of the invention comprises a counting unit 2 for counting the reference signal from a front edge of a pulse contained in the composite synchronizing signal; a horizontal synchronous separating unit 3 for determining and outputting a counting term as the horizontal synchronizing signal after the counting unit has counted from the front edge of the horizontal synchronizing signal to a predetermined number; and a vertical synchronous separating unit 4 for latching the composite synchronizing signal at a timing at which no pulse exists in the term of the vertical synchronizing signal based on the output of the counting unit, and for separating the vertical synchronizing signal.

Figure 6:
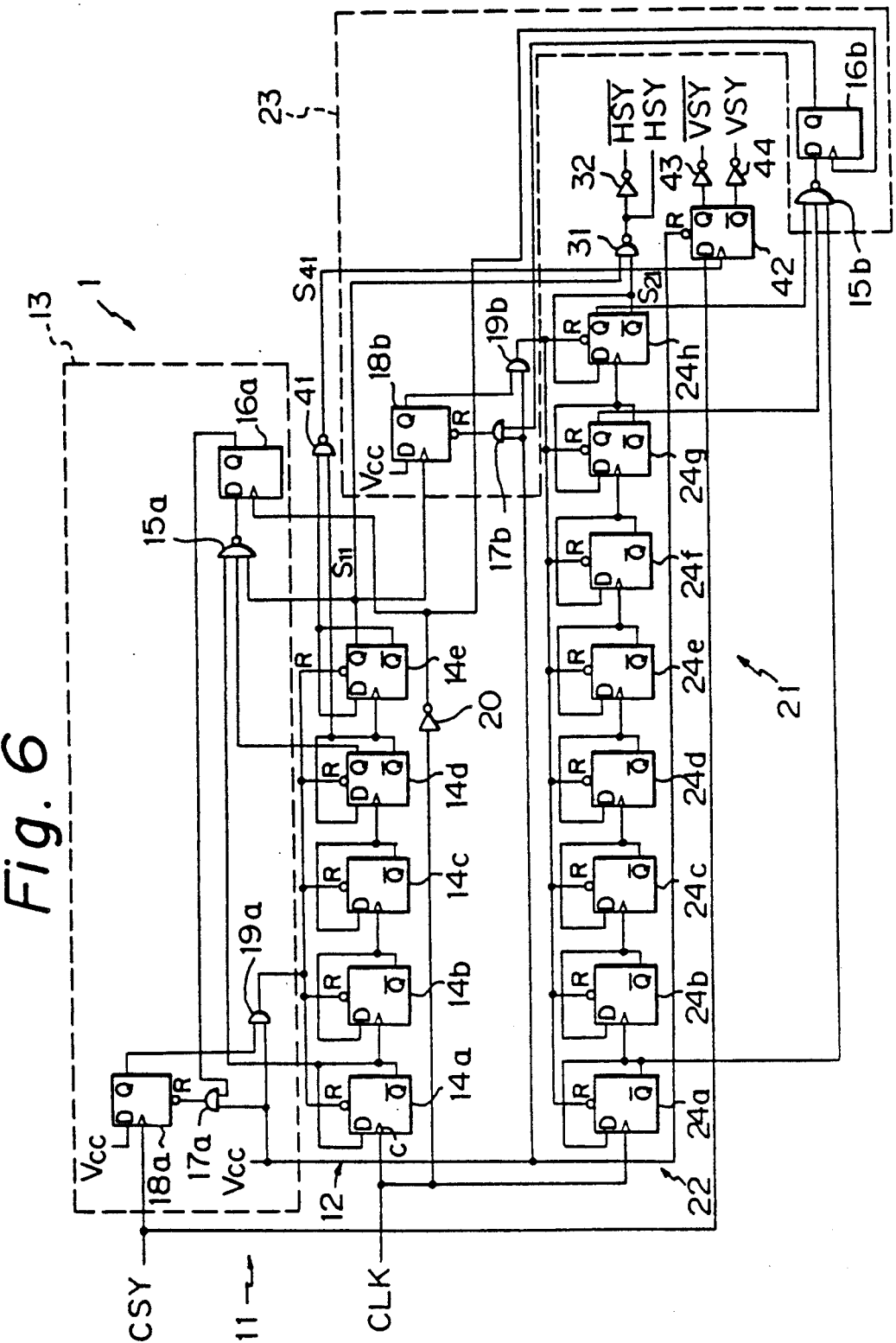
FIG. 6 is a circuit diagram of a synchronous separation circuit according to an embodiment of the present invention.

The unit 5 generates the clock signal as the reference signal having a frequency higher than the frequency of the horizontal synchronizing signal;

FIG. 6 is a circuit diagram of the synchronous separation circuit according to an embodiment of the present invention. This circuit is used for separating the horizontal and vertical synchronizing signals from the composite synchronizing signal based upon the NTSC method. In FIG. 6, the synchronous separation circuit 1 is constituted by a counting circuit 11, a first frequency dividing counter 12, a first reset circuit 13, a supplementary counter 21, a second frequency dividing counter 22, and a second reset circuit 23. The first frequency dividing counter 12 and the first reset circuit 13 are contained in the counting circuit 11. The first frequency dividing counter 12 is constituted by a plurality of D-type flip-flop circuits(D-FF's) 14a to 14e. In this structure, each inversion output $\bar{Q}$ is fed back to its own data input D. Accordingly, the D-FF's operate as a trigger flip-flop circuit (T-FF), based on this connection.

The clock signal CLK is, for example, a color subcarrier Fsc (3.5795 MHz) contained in the composite video signal in the NTSC method and is input to a clock input terminal C of the D-FF 14a. Since this clock signal is used as the reference signal for the synchronization, a constant clock signal must be precisely generated. In this embodiment, the color subcarrier Fsc is utilized as the clock signal, since it is relatively stable. The D-FF's 14a to 14e are connected in series and operate as a counter for dividing the clock signal CLK into a 1/32 frequency.

The first reset circuit 13 is constituted by a NAND gate 15a having three input terminals, D-FF's 16a 18a, and two AND gates 17A and 19a. The inversion output $\bar{Q}$ of the D-FF 14a, the output Q of the D-FF 14d, and the output Q of the D-FF 14e are input to corresponding input terminals of the NAND gate 15a, and the output of the NAND gate 15a is connected to the data input terminal D of the D-FF 16a. The clock signal CLK inverted by an inverter 20 is input to the clock input terminal of the D-FF 16a. The output Q of the D-FF 16a is input to one input terminal of the AND gate 17a and the power source Vcc is connected to the other input terminal of the AND gate 17a. The output of the AND gate 17a is input to the reset terminal R of the D-FF 18a. When the level of the reset terminal R is low, the D-FF 18a is reset and the level of the output Q becomes low.

The composite synchronizing signal CSY having a positive polarity is input to the clock input terminal C of the D-FF 18a and the power source Vcc is connected to the data input terminal D of the D-FF 18a. The output Q of the D-FF 18a is input to one input terminal of the AND gate 19a, and the power source Vcc is input to the other input terminal of the AND gate 19a. Since both input terminals of the And gates 17a and 19a are connected to the power source Vcc, the same logic level appears at the output thereof. The output of the AND gate 19a is connected to the reset input terminal R of each of the D-FF's 14a to 14e, and when the reset input terminal R of the D-FF is low each of the D-FF's 14a to 14e is reset and the output Q becomes low. Further, the inversion output $\overline{Q}$ becomes high.

When the reset input terminal R of each of the D-FF's becomes high, the first frequency dividing counter 12 starts to count from a leading edge of the clock signal CLK. When all inputs of the NAND gate 15a become high, the first frequency dividing counter 12 is reset by the first reset circuit 13. Namely, when the first frequency dividing counter 12 counts up to 24, all inputs of the NAND gate 15a become high and the output thereof becomes low. The low level output of the NAND gate 15a is latched to the D-FF 16a from the trailing edge of the clock signal CLK and resets the D-FF 18a through the AND gate 17a.

Accordingly, when the output Q of the D-FF 18a becomes low, each of the D-FF's 14a to 14e is reset, and when the output Q of the D-FF 18a is high, the first frequency dividing counter 12 again starts to count. In this case, when the high level of the data input D is latched from the leading edge of the composite synchronizing signal, the output Q becomes high and the first frequency dividing counter 12 starts to count. As explained above, the counter 11 starts to count from the leading edge of the composite synchronizing signal CSY. When the counter 11 counts the clock signal CLK up to 24, the counter 11 is reset and stops counting until the leading edge of the next composite synchronizing signal appears.

The supplementary counter 21 is constituted by the second frequency dividing counter 22 and the second reset counter 23. The second frequency dividing counter 22 is constituted by the D-type flip-flop (D-FF's) circuits 24a to 24h. The inversion output $\overline{Q}$ of each of the D-FF's 24a to 24h is fed back to its own data input terminal D. Accordingly, each D-FF operates as a T-type flip-flop(T-FF) circuit. The clock signal CLK is input to the clock input terminal C of the D-FF's 24a to 24h connected in series, and accordingly, the second frequency dividing counter 22 operates as a counter dividing the clock signal CLK into a 1/256 frequency.

The second reset circuit 23 has the same structure as the first reset circuit 13, and accordingly, 15b represents a NAND gate, 16b and 18b represent D-FF's, and 17b and 19b represent AND gates. The second frequency dividing circuit 22 is reset by the second reset circuit 23 when all inputs of the AND gate 15b become high. In this case, the inversion output $\overline{Q}$ of the D-FF 24a, the output Q of the D-FF 24g, and the output Q of the D-FF 24h are connected to the input terminals of the AND gate 15b, and accordingly, when the second frequency dividing circuit 22 counts up to 192, the D-FF's 24a to 24h are reset. When the output Q of the D-FF 18b becomes high, the second frequency dividing circuit 22 starts to count. In this case, when the output of the counter 11, i.e., the output Q of the D-FF 14e, becomes high, the data input D of the D-FF 18b is latched to the high level and the second frequency dividing circuit 22 starts to count.

As explained above, the second frequency dividing circuit 22 starts to count from the leading edge of the output signal of the counter 11, and when the second frequency dividing circuit 22 has counted the clock signal up to 192, it is reset and stops counting the clock signal until the leading edge of the next output of the counter 11 appears.

The outputs of the counter 11 and the supplementary counter 21 (inversion output $\overline{Q}$ of the D-FF 24h) are input to the NAND gate 31. The output of the NAND gate 31 is the horizontal synchronizing signal HSY, and the inversion output $\overline{HSY}$ is obtained through the inverter 32. In this case, the supplementary counter 21 and the NAND gate 31 perform the horizontal synchronous separation function.

The outputs of the D-FF's 14d and 14e in the first frequency dividing counter 12 are input to the NAND gate 41, and the output of the NAND gate 41 is input to the clock input terminal C of the D-FF 42. The reset input terminal R of the D-FF 42 is connected to the power source Vcc. The composite synchronizing signal CSY is input to the data input terminal D of the D-FF 42; the output Q and the inversion output $\overline{Q}$ of the D-FF 42 are connected to the input terminals of the inverters 43 and 44, and the outputs of the inverters 43 and 44 are the vertical synchronizing signals VSY and the inversion signal $\overline{VSY}$. In this case, the NAND gate 41 and the D-FF 42 perform the vertical synchronous separation function.

Figure 7:
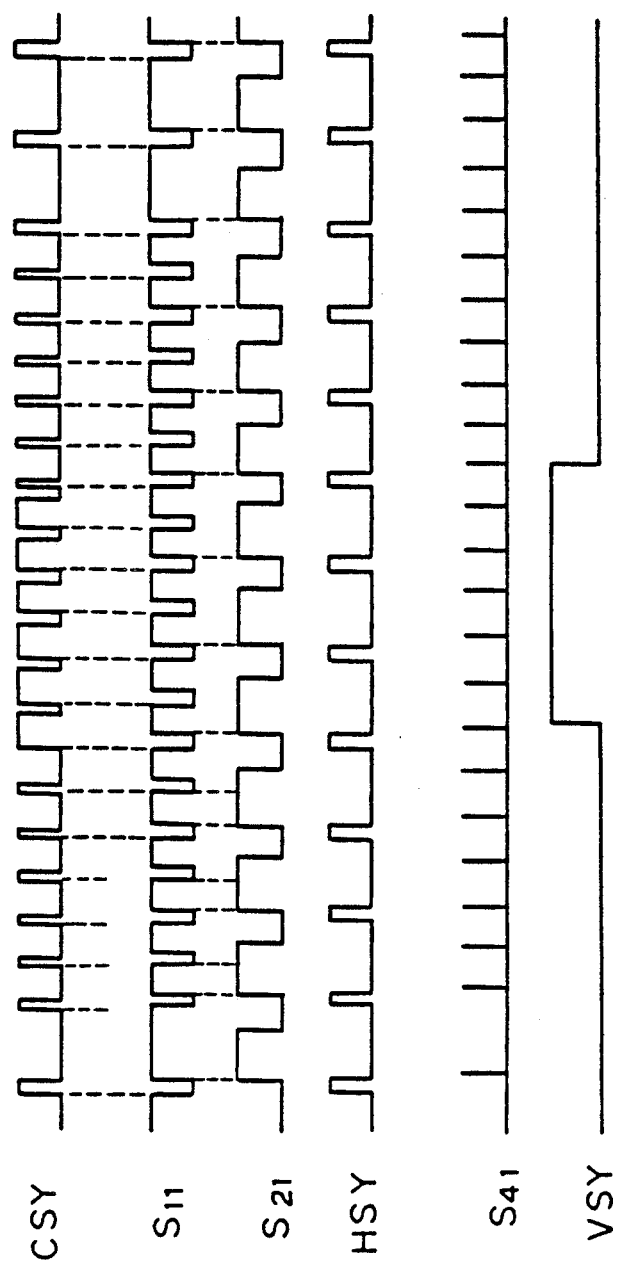
FIG. 7 is a signal timing chart for explaining an operation of the circuit shown in FIG. 6.

FIG. 7 is a signal timing chart for explaining the operation of the circuit shown in FIG. 6. In FIG. 7, as explained above, CSY is the composite synchronizing signal, $S_{11}$ is the output of the counter 11, $S_{21}$ is the output of the supplementary counter 21, HSY is the horizontal synchronizing signal, $S_{41}$ is the output of the NAND gate 41, and VSY is the vertical synchronizing signal.

The signal timing of the composite synchronizing signal is already defined in detail in the NTSC method. For example, when the period of the horizontal scanning synchronizing pulse is 1 H, the pulse width of the horizontal synchronizing signal is 0.075 H, the pulse width of the cutting pulse(groove between the vertical synchronous pulses) is 0.07 H, and the pulse width of the equalizing pulse is 0.4 H. Further, each period of the pulse train formed by the horizontal synchronizing signal, the cutting pulse and the equalizing pulse in the vertical blanking term is also defined by 0.5 H from the front edge of each pulse. Accordingly, when the counter starts to count the reference signal having a frequency higher than that of the horizontal synchronizing signal, from the front edge of the composite synchronizing signal, it is possible to determine each of the positions of the horizontal synchronizing signal, the vertical synchronizing signal, and the supplementary pulse in response to the count number.

When the composite synchronizing signal CSY is input to the first reset circuit 13 in the counter 11, the reset of the first frequency dividing counter 12 is released by the first reset circuit 13 from the leading edge of the composited synchronizing signal CSY, and the first frequency dividing counter 12 starts to count the composite synchronizing signal. When the first frequency dividing counter 12 counts the clock signal CLK up to 24, the first frequency dividing counter 12 is reset. Further, the first frequency dividing counter 12 is reset again after a count of 24 from the leading edge of next pulse contained in the composite synchronizing signal CSY. At that time, the count of the counter 11 corresponds to 24 clock cycles of the clock signal CLK, and this value is approximately 0.1 H. Accordingly, the horizontal synchronizing signal and the supplementary pulse appear at the output of the counter 11 as shown in FIG. 7.

The second frequency dividing counter 22 operates in the same way as the first frequency dividing counter 12. When the clock input of the D-FF 18b becomes high, the second frequency dividing counter 22 is reset after a count of 196. Namely, since the second frequency dividing counter 22 starts to count from the leading edge of the signal $S_{11}$, the output $S_{21}$ of the supplementary counter 21 is reset after a count of 196 from the leading edge of the signal $S_{11}$. At that time, the leading edge of the signal $S_{11}$ is synchronized with the trailing edge of the horizontal synchronizing signal, the pulse width of the signal $S_{21}$ is 196 clock cycles(0.86 H), and accordingly, the equalizing pulse and the cutting pulse are generated while the signal $S_{21}$ is high. Therefore, when the signals $S_{11}$ and $S_{21}$ are input to the NAND gate 31, the horizontal synchronizing signal HSY is output from the NAND gate 31.

Although the supplementary counter 21 starts to count from the leading edge of the signal $S_{11}$, sometimes the count is based on the supplementary pulse. In this case, since the second frequency dividing counter 22 does not stop counting until a count of 196 is reached, the counting operation is continued even when the horizontal synchronizing signal appears during the count. When the vertical blanking term is finished and the supplementary pulse does not exist, the counter starts to count from the leading edge of the horizontal synchronizing signal. The normal operation is preformed after the above operation.

The output $S_{41}$ of the NAND gate 41 triggers the D-FF 42 when the inversion output $\overline{Q}$ of each of the D-FF's 14d and 14e is low. Namely, the signal $S_{41}$ becomes high at only half a cycle of the clock signal CLK just before the trailing edge of the horizontal synchronizing signal HSY obtained by the NAND gate 31. At that time, since the pulse width of the signal $S_{11}$ is 0.1 H, the signal timings of the horizontal synchronizing pulse, equalizing pulse, and cutting pulse contained in the composite synchronizing signal do not coincide with the timing at which the signal $S_{41}$ becomes high. Accordingly, when the composite synchronizing signal input to the data terminal D of the D-FF 42 is triggered by the signal $S_{41}$, it is possible to pick up the term of the high level of the pulse as the vertical synchronizing signal VSY.

As explained above, the horizontal synchronizing signal and the vertical synchronizing signal according to the present invention are generated based on the digital signal processing technique, without using the differential circuit and the integrating circuit, and accordingly, the IC circuit can be easily and inexpensively manufactured, the reliability improved, the circuit miniaturized, and maintenance simplified.

In the above embodiment, although the explanations are given with reference to the composite synchronizing signal of the NTSC method, the digital synchronous separation circuit of the present invention can be easily applied to the PAL method and the SECAM method.

Further, although an asynchronous type counter is provided for the first and second counters 12 and 22, a synchronous type counter can be used instead.

Still further, although the counter 11 and the supplementary counter 21 are independently provided in the synchronous separation circuit, the output of the D-FF's 24d and 24e of the supplementary counter 21 can be utilized, and in this case, only one counter need be provided in the synchronous separation circuit, and thus the costs are reduced and the integration circuit is further miniaturized.

Still further, although the color subcarrier Fsc is used as the clock signal CLK in this embodiment, an oscillator can be provided for generating the clock signal CLK, and in this case, the frequency of the clock signal is set to a value higher than that of the horizontal synchronizing signal.

What is claimed is:

1. A synchronous separation circuit used in a television video circuit for generating a horizontal synchronizing signal and a vertical synchronizing signal from a composite synchronizing signal comprising:
   a clock signal generating circuit for generating said clock signal having a frequency higher than a frequency of said horizontal synchronizing signal;
   a first frequency dividing circuit for receiving said clock signal and generating a first signal ($S_{11}$) by starting to count the clock signal from a leading edge of said composite synchronizing signal up to a first predetermined count number;
   a second frequency dividing circuit for receiving said clock signal and generating a second signal ($S_{21}$) by starting to count the clock signal from a leading edge of said first signal up to a second predetermined count number larger than said first predetermined count number;
   a first reset circuit for resetting said first frequency dividing circuit at every said first predetermined count number;
   a second reset circuit for resetting said second frequency dividing circuit for outputting said horizontal synchronizing signal from said first and second signals; and
   a latch circuit for latching said composite synchronizing signal in response to a trigger signal which is based on the first signal, thereby to separate said vertical synchronizing signal from said composite synchronizing signal.

2. A synchronous separation circuit as claimed in claim 1, wherein said first frequency dividing circuit comprises a plurality of D-type flip-flop circuits connected in series to form T-type flip-flop circuits.

3. A synchronous separation circuit as claimed in claim 2, wherein said second frequency dividing circuit comprises a number of D-type flip-flop circuits greater than that of said first frequency dividing circuit, and each of said D-type flip-flop circuits is connected in series to form T-type flip-flop circuits.

* * * * *

UNITED STATES PATENT AND TRADEMARK OFFICE
CERTIFICATE OF CORRECTION

PATENT NO. : 4,999,708
DATED : March 12, 1991
INVENTOR(S) : AOKI et al.

It is certified that error appears in the above-identified patent and that said Letters Patent is hereby corrected as shown below:

Title PAGE: [57] ABSTRACT, line 17, after "unit" insert --to--.

Col. 3, line 2, after "capacitor" delete --.--;
line 10, change "on" to --an--;
line 14, change "triggers" to --trigger--.

Col. 4, line 55, after "16a" insert --and--.

Col. 5, line 10, change "And" to --AND--.

Col. 7, line 5, before "next" insert --the--;
lines 39-40, change "preformed" to --performed--.

Signed and Sealed this

Sixth Day of July, 1993

Attest:

MICHAEL K. KIRK

Attesting Officer     Acting Commissioner of Patents and Trademarks